United States Patent [19]

Saito et al.

[11] Patent Number: 4,663,401
[45] Date of Patent: May 5, 1987

[54] EPOXY RESIN COMPOSITION

[75] Inventors: Yasuhisa Saito, Higashiosaka; Akira Morii; Hiroshi Nakamura, both of Ibaraki, Japan

[73] Assignee: Sumitomo Chemical Company, Limited, Osaka, Japan

[21] Appl. No.: 729,873

[22] Filed: May 2, 1985

[30] Foreign Application Priority Data

May 17, 1984 [JP] Japan .................................. 59-100074

[51] Int. Cl.$^4$ ...................... C08L 63/02; C08L 63/04; C08L 63/06
[52] U.S. Cl. ................................... 525/505; 525/523; 525/906
[58] Field of Search ................. 525/535, 505, 523, 906

[56] References Cited

U.S. PATENT DOCUMENTS 3,530,087  9/1970  Hayes et al. .......................... 525/535
3,663,507  5/1972  Vogel et al. .......................... 525/535

Primary Examiner—Lewis T. Jacobs
Assistant Examiner—Robert E. L. Sellers, II
Attorney, Agent, or Firm—Stevens, Davis, Miller & Mosher

[57] ABSTRACT

A thermosettable epoxy resin composition comprising 100 parts by weight of an epoxy resin, 5 to 40 parts by weight of polysulfone resin having both a resorcinol moiety and 4,4'-dichlorodiphenylsulfone moiety in the molecular chain, and an effective amount of a curing agent, which gives a cured product excellent in toughness as well as in curability, adhesion, mechanical strength at high temperatures and resistance to chemicals.

7 Claims, No Drawings

EPOXY RESIN COMPOSITION

The present invention relates to a thermosettable epoxy resin composition. More specificablly, the invention relates to a thermosettable epoxy resin composition capable of giving cured products excellent in toughness and mechanical properties at a high temperature.

In general, epoxy resins are excellent in properties such as curability, adhesion, mechanical strength, resistance to chemicals and the like. Therefore, the epoxy resins have been widely used as materials for the production of molded products, laminates, adhesives and the like, and also as matrix resins for fiber-reinforced composite materials. However, the epoxy resins are yet insufficient due to their brittleness. For example, cured products obtained by curing the epoxy resins using a conventional curing agent such as amines and acid anhydrides are inferior in their impact resistance and ultimate elongation.

In order to overcome such defects, many attempts have been made to find an epoxy resin composition sufficient in toughness. One of them is to blend the epoxy resin with a thermoplastic resin.

For example, in order to improve toughness of the epoxy resins without deterioration of the inherent thermal resistance, it has been attempted to blend the epoxy resin with a thermoplastic polysulfone resins, which are excellent in thermal resistance and have a structure such that aromatic rings are bonded through both sulfone and ether linkages. However, any desired result meeting the needs has never been obtained. The said thermoplastic polysulfone resins can be represented by the following formula (I),

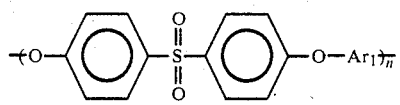
(I)

wherein $Ar_1$ is a divalent aromatic group, and n is a positive number. One of commercially available polysulfone resins is Udel Polysulfone P-1700, produced by UCC in USA, the divalent aromatic group represented by $Ar_1$ in the formula (I) being

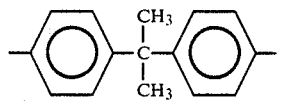

(hereinafter referred to as bisphenol A type polysulfone resin). Others are Victrex Polyethersulfone 100P, 200P and the like, produced by ICI in UK, the divalent aromatic group $Ar_1$ being

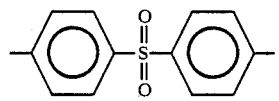

(hereinafter referred to as polyethersulfone resin).

For completion of blending the bisphenol A type polysulfone resin with the epoxy resin, a high temperature is required, and the resulting belnd markedly increases its viscosity. In practice, therefore, the amount of the bisphenol A type polysulfone resin to be blended must be limited to a certain degree, so that a sufficient toughness can hardly be attained. This is because the bisphenol A type polysulfone resin has a moleuclar weight as high as 40000 to 50000. Whereas, other bisphenol A type polysulfone resins having a lower molecular weight can be blended with the epoxy resin without remarkable increase of the viscosity, and can be used in a larger amount. In such a case, however, the toughness cannot be improved so much.

The polyethersulfone resin is easily compatible with the epoxy resin, as compared with the bisphenol A type polysulfone resin. In order to obtain a sufficient toughenss, the polyethersulfone resin must be blended in an amount of not less than 40 to 50 parts by weight based on 100 parts by weight of the epoxy resin. In such a case, however, the crosslinking density after curing the blend markedly decreases, resulting in losing the characteristics of the epoxy resin as the thermosettable resin. Thus, problems of creep, solvent resistance, water resistance and the like of the cured products remain unsolved.

Workers in the art, however, have been unwilling to disregard the fact that the polysulfone resin represented by the formula (I) has excellent thermal resistance, in other words, has a glass transition point as high as about 200° C., and thus the present inventors have undertaken extensive studies to find a modified polysulfone resin capable of imparting toughness to the epoxy resins without any trouble and deterioration of characteristic features of the epoxy resins. As a result, the present inventors have found a modified polysulfone resin having both a resorcinol moiety and a 4,4'-diphenylsulfone moiety in the molecular chain, which can impart excellent toughness to the epoxy resins even in a smaller amount than that of other known polysulfone resins, wihtout deterioration of the excellent strength and rigidity peculiar to the epoxy resins.

The present invention provides a thermosettable epoxy resin composition comprising an epoxy resin, a polysulfone resin having both a 1,3-phenylene group and a group of

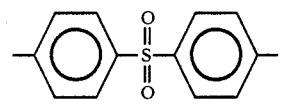

in the molecular chain (hereinafter referred to as resorcinol polysulfone resin), and a curing agent.

The epoxy resins usable in the present invention are those having at least two epoxy groups in the molecule. Examples thereof are polyglycidyl ethers derivable from dihydric phenols such as bisphenol A, bisphenol F, hydroquinone, resorcinol and the like, polyhydric phenols such as phloroglucinol, tris-(4-hydroxyphenyl)methane, 1,1,2,2-tetraxis(4-hydroxyphenyl)ethane and the like, or halogenated dihydric phenols such as tetrabromobisphol A and the like, novolak epoxy resins derivable from reaction products (novolak resins) between phenols such as phenol, o-cresol and the like and formaldehyde, aromatic amine epoxy rsins derivable from aromatic amines such as p-aminophenol, m-aminophenol, 4,4'-diaminodiphenylmethane, p-phenylenediamine, m-phenylenediamine, p-xylylenediamine, m-xylylenediamine, aniline, 3,3'-diaminodiphenylmethane, 4,4'-diaminodiphenylether, 3,4'-diaminodiphenylether, 2,6-toluenediamine, 2,4- toluenediamine, 6-amino-m-cresol, 4-amino-m-cresol, 1,4-bis(4-aminophenoxy)benzene, 1,4-bis(3-aminophenoyx)benzene, 1,3-bis(4-aminophenoxy)benzene, 1,3-bis(3-aminophenoxy)benzene, 2,2-bis(4-aminophenoxyphenyl)propane, and the like, alicyclic amine epoxy resins derivable from 1,4-cyclohexane-bis(methylamine), 1,3-cyclohexane-bis(methylamine) and the like, aromatic carboxylic epoxy resins derivable from aromatic carboxylic acids such as p-hydroxybenzoic acid, m-hydroxybenzoic acid, terephthalic acid, isophthalic acid and the like, hydantoin epoxy resins derivable from 5,5-dimethylhydantoin, alicyclic epoxy resins such as 2,2-bis(3,4-epoxycyclohexyl)propane, 2,2-bis[4-(2,3-epoxypropyl)cyclohexyl]propane, vinylcyclohexene dioxide, 3,4-epoxycyclohexylmethyl-3,4-epoxycyclohexanecarboxylate and the like, and others such as triglycidylisocyanurate, 2,4,6-triglycidoxy-s-triazine and the like, and their rubber or urethane modified products. These epoxy resins may be used each alone or in a mixture of two or more.

Among these epoxy resins, preferred are aromatic amine epoxy resins, novolak epoxy resins and mixtures thereof. When the preferred epoxy resins are used, a higher thermal resistance can be achieved.

The resorcinol polysulfone resin usable in the present invention can be represented by the following formula,

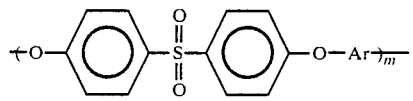

wherein Ar is 1,3-phenylene or a divalent group formed by taking 1,3-phenylene together with at least one member selected from

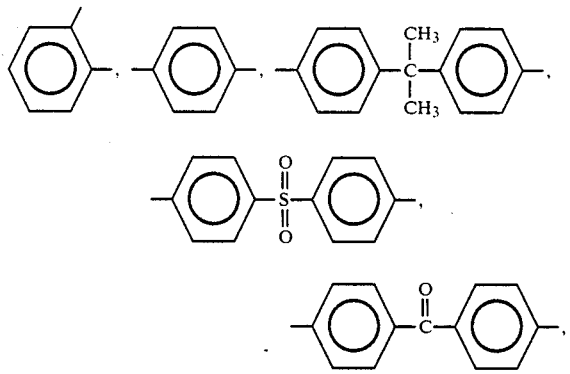

and the like, and m is a positive number such as from about 50 to about 300, preferably about 100 to about 200. Each benzene nucleus in the above formula may be substituted with methyl, ethyl or the like.

The resorcinol polysulfone resin can be prepared by a method known for the preparation of conventional polysulfone resins. For example, a mixture of resorcinol and an alkali metal hydroxide such as sodium hydroxide is subjected to dehydration in a solvent such as dimethylsulfoxide, producing disodium salt of resorcinol. Then, the resulting salt is allowed to react with a 4,4'-disubstituted diphenylsulfone such as 4,4'-dichlorodiphenylsulfone, 4,4'-difluorodiphenylsulfone and 4,4'-dinitrodiphenylsulfone liberating sodium chloride, whereby the desired resorcinol polysulfone resin can be produced.

According to this method, the molecular weight of the resin varies depending on the molar ratio between the disodium salt of resorcinol and 4,4'-dichlorodiphenylsulfone. Preferably, the reaction is carried out using the disodium salt in a somewhat excess amount, and is discontinued by adding methyl chloride or the like to perform a terminal methoxylation.

In the above method, a part of resorcinol may be replaced by catechol, hydroquinone, bisphenol A, bisphenol S (4,4'-dichlorodiphenylsulfone), 4,4'-dihydroxybenzophenone or the like.

The molecular weight of the resorcinol polysulfone resin is not particularly limited, but usually ranges from about 15,000 to about 90,000, preferably from about 20,000 to about 70,000, more preferably from about 30,000 to about 50,000. In the present invention, the molecular weight is a peak molecular weight in terms of polystyrene measured by gel permeation chromatography. Even the resorcinol polysulfone resins having a molecular weight of about 50,000 or more are readily compatible with the epoxy resin to form a transparent resin composition.

The resorcinol polysulfone resin may be used in an amount of 5 to 40 parts by weight, preferably 10 to 30 parts by weight, based on 100 parts by weight of the epoxy resin.

As the curing agent usable in the present invention, preferred are dicyandiamide and aromatic amines. Examples of the aromatic amines are 4,4'-diaminodiphenylsulfone, 3,3'-diaminodiphenylsulfone, 4,4'-diaminodiphenylmethane, 4,4'-diaminodiphenylether, m-phenylenediamine, p-phenylenediamine, 4,4'-methylene-bis-o-chloroaniline, tetrachlorodiaminodiphenylmethane, 4,4'-diaminostilben, 4,4'-diaminodiphenylsulfide, m-xylylenediamine, p-xylpylenediamine, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxyphenyl)propane, 4,4'-bis(4-aminophenoxy)diphenylsulfone, 4,4'-bis(3-aminophenoxy)diphenylsulfone, 4,4'-bis(4-aminophenoxy)diphenylsulfide, 3,3'-diaminodiphenylmethane, 3,4'-diaminodiphenylether, 2,4-toluenediamine, 2,6-toluenediamine, 5-amino-1-(4'-aminophenyl)-1,3,3-trimethylindane, 6-amino-1-(4'-aminophenyl)-1,3,3-trimethylindane and the like. These amines may be used each alone or in a mixture of two or more.

Besides those described above, acid anhydrides may be also employed as the curing agent.

These curing agents may be used in an effective amount such as almost stoichiometric amount.

If desired, a conventional curing accelerator may be employed. Examples thereof are tertiary amines, phenol compounds, imidazols, Lewis acids and the like. Moreover, extenders, fillers or pigments may be employed for the resin composition of the present invention. Examples thereof are glass fibers, carbon fibers, alumina fibers, asbestos fibers, silica, calcium carbonate, antimony trioxide, kaolin, titanium dioxide, zinc oxide, mica, baryta, carbon black, polyethylene powder, polypropylene powder, aluminum powder, iron powder, copper powder and the like.

The resin composition of the present invention can be prepared by blending the epoxy resin, the resorcinol polysulfone resin, and the curing agents, if desired together with the other additives described above, in a conventional manner.

The thus obtained epoxy resin composition in accordance with the present invention can be used as matrix resins for fiber-reinforced composite materials, and also as materials for the production of moldings, laminates, adhesives and the like.

The present resin composition can exhibit characteristic features, particularly when reinforced with strong and highly elastic fibers such as carbon fiber to produce valuable structural materials.

A conventional carbon fiber-reinforced epoxy resin is light in the weight and high in the strength and elasticity, and therefore is important as materials for the manufacture of aircrafts. However, it is insufficient in toughness, and therefore low in impact strength, so that cracks once generated are readily spread to bring fatal rupture upon the mateirals. Moreover, there are inconveniences such that carbon fibers, per se, have been markedly improved in their ultimate elongation and strength, but composite materials produced by reinforcing a conventional epoxy resin with such carbon fibers cannot be improved in their ultimate elongation and strength. In order to solve these problems, it has been attempted to replace the epoxy resin with an epoxy resin having plasticity. In such case, however, another problem occurs such that the resulting composite materials lose their rigidity at a high temperature.

Under these circumstances, the epoxy resin composition of the present invention can solve these problems. That is, the composite materials prepared by reinforcing the present epoxy resin composition with carbon fibers have excellent impact resistance and require a large energy for rupture spread. Particularly, the composite materials prepared using a carbon fiber excellent in ultimate elongation can exhibit a large tensile strength.

The carbon fibers usable for such purpose are not limited, but preferred are those having a tensile strength of 150 Kgf/mm$^2$ or more, and an elastic modulus of 15,000 Kgf/mm$^2$ or more. Besides the carbon fibers, alumina fibers, silicon carbide fibers, aramide fibers and the like may be used in so far as they have similar mechanical properties. These fibers may be used each alone or in a mixture of two or more, or in a mixture with other additives such as granular fillers described above.

The composite materials can be produced using the epoxy resin composition of the present invention and fiber materials in a conventional manner. Preferred volumetric percentage of the fiber in the composite materials ranges from about 20 to 30%.

The present invention is illustrated in more detail with reference to the following Examples, which are not intended to limit the scope of the present invention. Parts are by weight, unless otherwise specified.

REFERENCE EXAMPLE 1

In a flask equipped with a stirrer, a thermometer and a cooling separator were placed resorcinol (66.1 parts), dimethylsulfoxide (306 parts), chlorobenzene (613 parts) and 48% strength sodium hydroxide solution (100 parts). The mixture was heated to 115° C., while substituting the atmosphere with nitrogen gas. At this temperature, azeotropic dehydration was initiated, and then discontinued at 140° C. Thereafter, the reaction mixture was further heated to 160° C. to evaporate the chlorobenzene.

After distillation of the chlorobenzene, the mixture was cooled to below 50° C., and at this temperature was added 4,4'-dichlorodiphenylsulfone (168.4 parts). The mixture was heated to 160° C., and polymerization was continued for 3 hours at that temperature. Thereafter, the reaction mixture was cooled to 130° C., and methyl chloride gas was thoroughly introduced into the reaction mixture to perform terminal methoxylation.

The resulting reaction mixture was poured into water to precipitate the desired resorcinol polysulfone resin. The molecular weight of the resin was found to be 44,000 in terms of polystyrene by gel permeation chromatography.

REFERENCE EXAMPLE 2

Reference Example 1 was repeated, except that a mixture of resorcinol (33.0 parts) and bisphenol A (68.4 parts) was used in place of resorcinol alone (66.1 parts), thereby obtaining the desired resorcinol polysulfone resin having a molecular weight of 47,000.

EXAMPLE 1

The resorcinol polysulfone resins obtained in Reference Examples 1 and 2 were respectively dissolved in tetrahydrofuran (THF) in an amount shown in the following table to form each about 30% by weight THF solution. To this solution were added Sumiepoxy ELM120 (m-aminophenol type epoxy resin, produced by Sumitomo chemical Co., 67 parts) and DEN 431 (phenol novolak type epoxy resin, produced by Dow Chemical Inc., 30 parts), and the mixture was stirred thoroughly. The uniform solution was placed in a vacuum oven and allowed to stand under a reduced pressure at 150° C., until THF was completely removed.

The resulting viscous solution was heated to about 100° C., and then mixed with a curing agent of disminodiphenylsulfone (37 parts: about 0.8 equivalent to the epoxy resins). The mixture was preliminarily stirred for a short period of time, and after cooling to 80° C. mixed with a 40% solution of a curing accelerator (5 parts), which has been prepared by diluting BF$_3$-piperidine with Araldite CY179 (a reactive diluent, produced by Ciba-Geigy Inc.). The mixture was kneaded at 80° C. using a three-arm roller to obtain a uniform resin composition.

The thus obtained resin composition was debubbled and cured to prepare a resin plate, which was then measured for its physical properties.

For the comparison purpose, a resin plate was, likewise, prepared, provided that no resorcinol polysulfone resin was used.

The physical properties of the plate are as shown in the following table.

| Sample | A | B | C | D |
| --- | --- | --- | --- | --- |
| Amount of resorcinol polysulfone resin used (parts) | 0 | 20 | 30 | 20 |
| Critical strain energy release rate*[1] Gic (Kj/m$^2$) | 0.10 | 0.75 | 1.0 | 0.70 |
| Ultimate elongation*[2] (%) | 1.5 | 2.3 | 3.0 | 2.2 |
| Retension of bending | 65 | 75 | 80 | 80 |

|Sample|A|B|C|D|
|---|---|---|---|---|
|elastic modulus*3 (%)| | | | |

Note:
*1 ASTM E-399-78
*2 JIS K6911-79-5.18
*3 JIS K6911-79-5.17

Retension = $\frac{\text{Elastic modulus at 120° C.}}{\text{Elastic modulus at room temp.}} \times 100$ In the preparation of both samples B and C, the resorcinol polysulfone resin obtained in Reference Example 1 was used, and in the sample D, that obtained in Reference Example 2 was used.

EXAMPLE 2

Using a resin composition (130 parts) prepared in the same manner as that in Example 1 for the preparation of Sample C as a matrix, and a carbon fiber having a tensile strength of 420 Kgf/mm², an elastic modulus of 24,000 Kgf/mm² and an ultimate elongation of 1.8%, a unidirectionally reinforced composite material was prepared in a manner known per se (Sample E).

For the comparison purpose, a similar composite material was prepared, except that no resorcinol polysulfone resin was used (Sample F).

Physical properties of these materials are as shown in the following table.

|Sample| |E|F|
|---|---|---|---|
|Tensile strength*1 (Kgf/mm²)| |248|195|
|Ultimate elongation*2 (%)| |1.76|1.32|
|Bending elastic Modulus*3 (Kgf/mm²)|Room temp.|13.8 × 10³|14.0 × 10³|
| |120° C.|12.9 × 10³|13.1 × 10³|
|Critical strain energy release rate GiC*4 (Kj/m²)| |1.0|0.15|
|Izod impact value*5 (Kj/m²)| |220|150|

Note:
*1 ASTM D3039-76
*2 ASTM D3039-76
*3 ASTM D790-80
*4 NASA RP1092-83
*5 JIS K-6911-79-5.21

What is claimed is:

1. A thermosettable epoxy resin composition comprising:
   (1) an epoxy resin,
   (2) a polysulfone resin represented by the following formula,

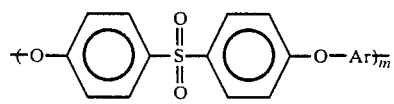

wherein Ar is a divalent aromatic group, 50–100 mole % of Ar is a 1,3-phenylene group and m is a positive number, and
   (3) a curing agent.

2. A thermosettable epoxy resin composition according to claim 1, wherein the epoxy resin is at least one member selected from the group consisting of polyglycidyl ethers derivable from dihydric phenols, polyhydric phenols or halogenated dihydric phenols, novolak epoxy resins, aromatic amine epoxy resins, alicyclic amine epoxy resins, aromatic carboxylic epoxy resins, hydantoin epoxy resins, alicyclic epoxy resins, triglycidylisocyanurate, 2,4,6-triglycidoxy-s-triazine, and their rubber or urethane modified products.

3. A thermosettable epoxy resin composition according to claim 1, wherein the polysulfone resin has a molecular weight of about 15,000 to about 90,000.

4. A thermosettable epoxy resin composition according to claim 1, wherein the divalent group is formed by taking 1,3-phenylene together with at least one member selected from the group consisting of

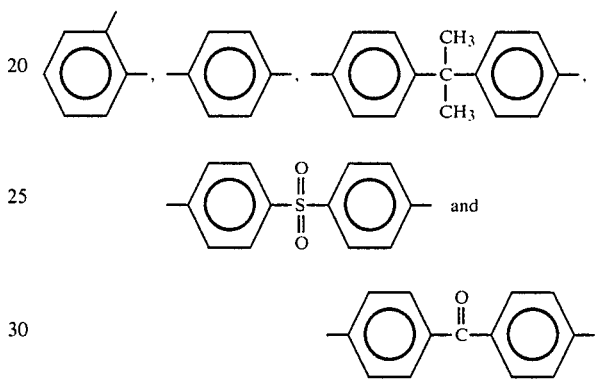

each benzene nucleus being unsubstituted or substituted with methyl or ethyl.

5. A thermosettable epoxy resin composition according to claim 1, wherein the curing agent is dicyandiamine or or an aromatic amine.

6. A thermosettable epoxy resin composition according to claim 5, wherein the aromatic amine is at least one member selected from the group consisting of 4,4'-diaminodiphenylsulfone, 3,3'-diaminodiphenylsulfone, 4,4'-diaminodiphenylmethane, 4,4'-diaminodiphenylether, m-phenylenediamine, p-phenylenediamine, 4,4'-methylene-bis-o-chloroaniline, tetrachlorodiaminodiphenylmethane, 4,4'-diaminostilben, 4,4'-diaminodiphenylsulfide, m-xylylenediamine, p-oylylenediamine, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxyphenyl)propane, 4,4'-bis(4-aminophenoxy)diphenylsulfone, 4,4'-bis(3-aminophenoxy)diphenylsulfone, 4,4'-bis(4-aminophenoxy)diphenylsulfide, 3,3'-diaminodiphenylmethane, 3,4'-diaminodiphenylether, 2,4-toluenediamine, 2,6-toluenediamine, 5-amino-1-(4'-aminophenyl)-1,3,3-trimethylindane, and 6-amino-1-(4'-aminophenyl)-1,3,3-trimethylindane.

7. A thermosettable epoxy resin composition according to claim 1, wherein the composition further comprises at least one additive selected from the group consisting of curing accelerators, extenders, fillers and pigments.

* * * * *